United States Patent

Kurihara

Patent Number: 6,006,294
Date of Patent: Dec. 21, 1999

[54] COMMUNICATIONS SYSTEM HAVING A LARGE STORING CIRCUIT COMMON FOR ALL LAYERS AND A PLURALITY OF SMALL STORING CIRCUITS FOR THE INDIVIDUAL LAYERS RESPECTIVELY

[75] Inventor: Masashi Kurihara, Odawara, Japan

[73] Assignee: Canon Kabushiki Kaisha, Tokyo, Japan

[21] Appl. No.: 09/018,953

[22] Filed: Feb. 5, 1998

[30] Foreign Application Priority Data

Feb. 12, 1997 [JP] Japan ................................ 9-028023
Jan. 19, 1998 [JP] Japan ................................ 10-007509

[51] Int. Cl.$^6$ ............................. H04J 3/16; H04J 3/22; H04L 12/28; H04L 12/56; G06F 12/00
[52] U.S. Cl. .................... 710/52; 370/903; 370/469; 709/230; 711/170; 711/171; 710/56
[58] Field of Search ................... 370/235, 469, 370/470, 903; 709/230, 236, 237, 300; 711/170, 171; 710/52, 56

[56] References Cited

U.S. PATENT DOCUMENTS 4,881,167  11/1989  Sasaki et al. ............................ 364/200
5,007,051  4/1991  Dolkas et al. .......................... 370/85.1
5,014,265  5/1991  Hahne et al. ............................. 370/60
5,289,470  2/1994  Chang et al. .......................... 370/94.1
5,375,233  12/1994  Kimber et al. .......................... 395/600
5,454,103  9/1995  Coverston et al. ..................... 395/600
5,493,566  2/1996  Ljungberg et al. ....................... 370/60
5,797,033  8/1998  Ecclesine ................................ 395/842
5,864,714  1/1999  Tal et al. ................................ 395/876
5,903,754  5/1999  Pearson .................................. 395/680
5,920,661  7/1999  Mori et al. ............................. 382/317

Primary Examiner—Thomas C. Lee
Assistant Examiner—Tanh Q Nguyen
Attorney, Agent, or Firm—Fitzpatrick, Cella, Harper & Scinto

[57] ABSTRACT

The invention relates to communication processing system and communication processing method which can process data at a high speed by efficiently and smoothly executing data processings for transmission and reception. The system has small scale memory areas which are independent in layers and a large scale memory area which is common to the layers. Data of a small size is transferred to the small scale memory areas and the large scale memory area is released.

30 Claims, 6 Drawing Sheets

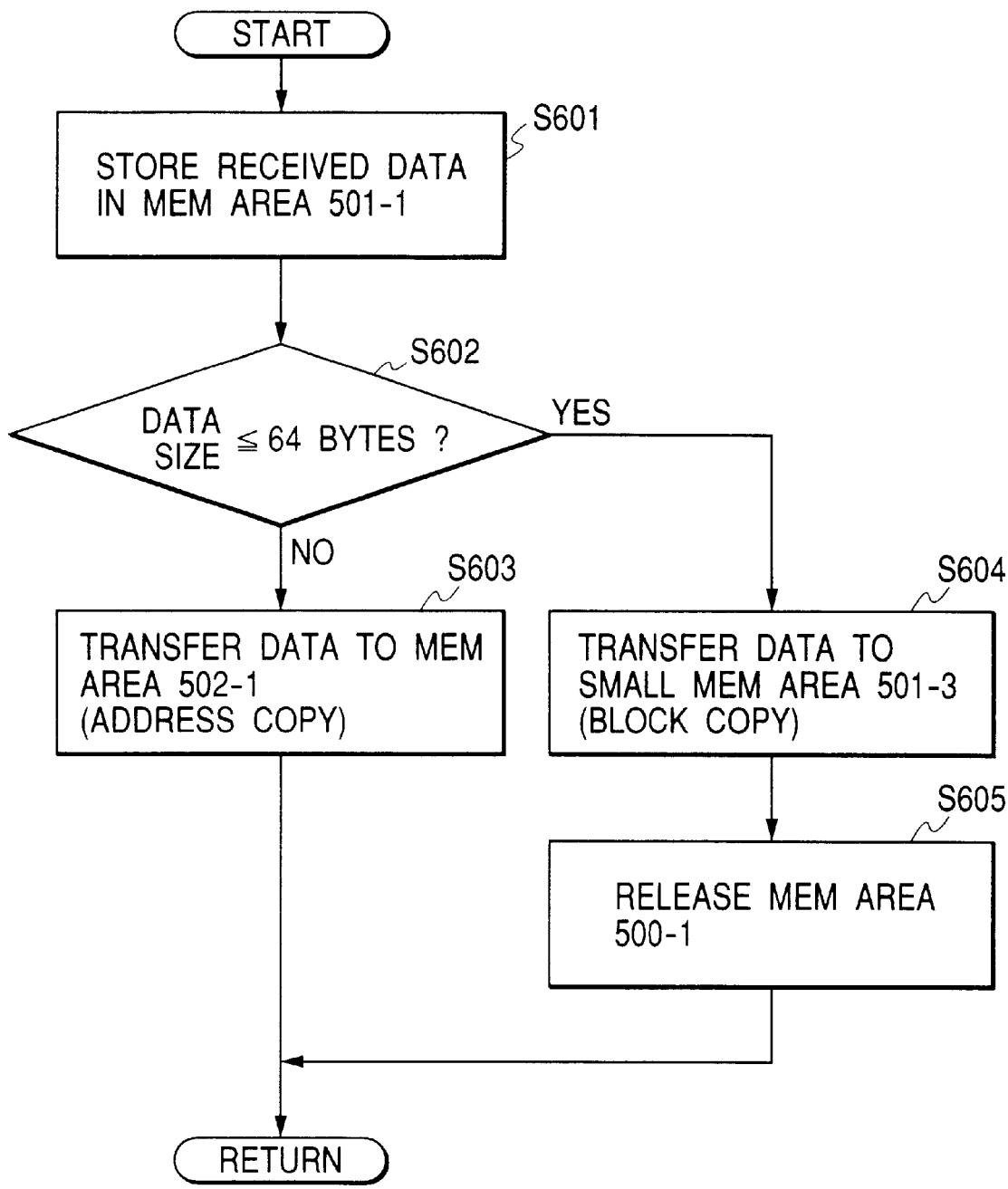

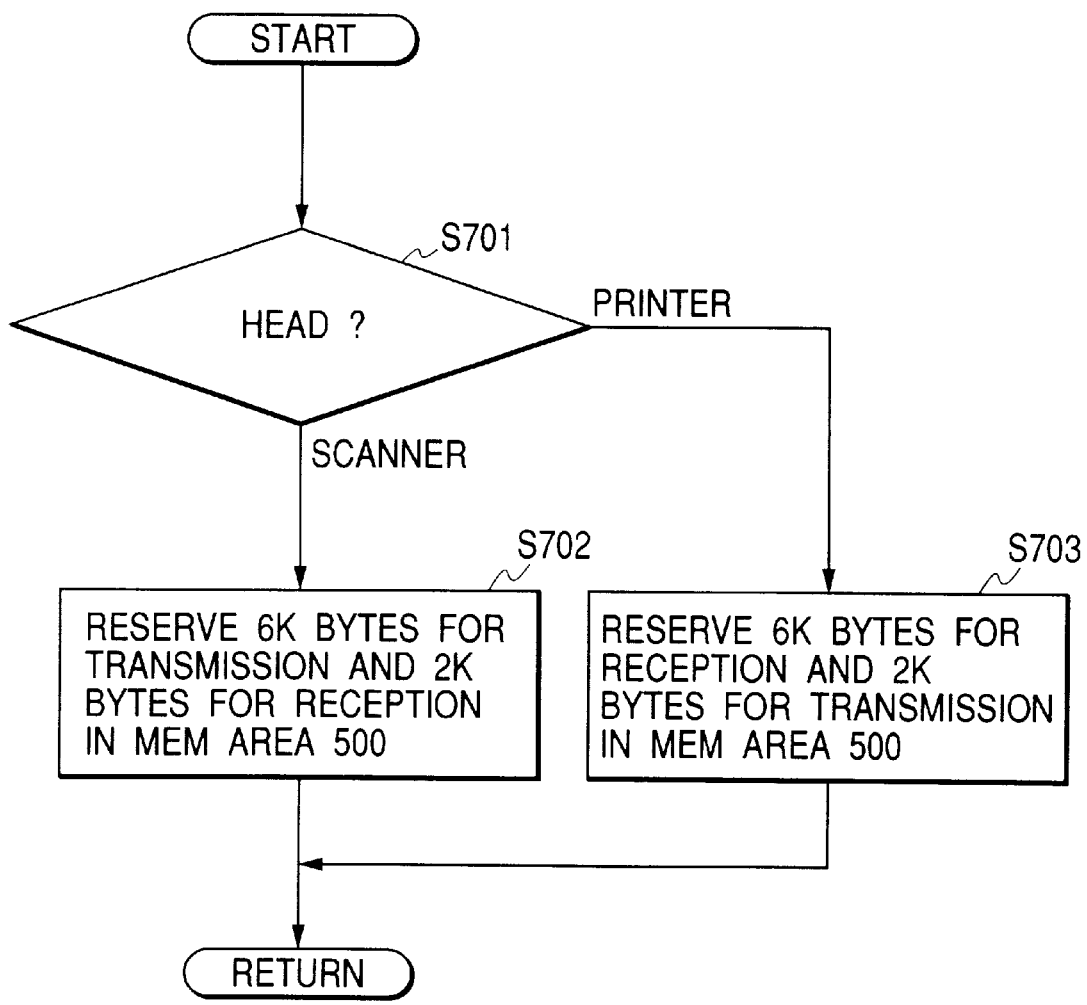

COMMUNICATIONS SYSTEM HAVING A LARGE STORING CIRCUIT COMMON FOR ALL LAYERS AND A PLURALITY OF SMALL STORING CIRCUITS FOR THE INDIVIDUAL LAYERS RESPECTIVELY

BACKGROUND OF THE INVENTION

1. Field of the Invention

The invention relates to communication processing system and communication processing method which are applied to data that is transmitted to a computer, a peripheral device, or the like via a wire or radio.

2. Related Background Art

In recent years, as one of the communication processing systems, there has been known a communication processing system such that an infrared transmitting and receiving apparatus transmits print data from a host computer which is built therein or is externally attached to a peripheral device such as a printer or the like similarly having the infrared transmitting and receiving apparatus and prints.

Data can be also transmitted from the peripheral device such as a printer or the like and, contrarily, data can be also transmitted from the peripheral device to the host computer.

In association with it, an amount of data which is transmitted from the host computer or the like also increases. On the other hand, although the whole function of the peripheral device such as a printer or the like is improved, their resources as well as hardware are not so changed. Therefore, data communicating apparatus and data processing in which a high speed processing can be performed are necessary.

Actually, in a sequence of a communication data processing via a wire or radio, a layer structure which is specified by the OSI is constructed in a form of a combination of software and hardware. Upon transmission, by repeating operations to add information peculiar to a layer to transmission data every layer and transfer the data to the lower layer, final transmission data is formed and the data transmission between the apparatuses is performed. Upon reception, by performing the opposite operations to the received data, namely, by repeating the operations to execute the operation for removing the added information and transfer the data to the upper position, reception data that is equivalent to the transmission data can be derived.

Therefore, since the increase in transmission data is seen as an increase in time which is required for printing in an output apparatus such as a printer or the like, a high speed processing of the reception data or transmission data is necessary.

An example of a protocol processing from an infrared port in the conventional system will now be described with reference to FIG. 5.

FIG. 5 shows an example in which a portion of a data processing which is executed in a layer on the reception side in FIG. 4, which will be explained hereinlater, is extracted. Reference numeral 401 denotes an area where the data received by a physical layer 400 has been written as it is. Areas 402 and 403 indicate layers. Hatched portions 401a, 402a, and 403a are portions which are processed in the layers, respectively. Portions 401b, 402b, and 403b denote data which is transferred to the upper layers.

Actual processings in FIG. 5 will now be described. Only the area 401 is assured as a memory area. As for the areas 402 and 403, a head address and an access right for the memory area are transferred between tasks, thereby sequentially processing in each layer (task). When the processing of the last layer 403 is finished, the access right is transferred to the first layer 401 and the accumulation of the next data is again started. By repeating those processings, data is continuously transferred from the infrared port to a reception buffer.

In the case where the host computer and the printer execute an infrared communication between two apparatuses by using a standardized protocol such as an infrared communication, since each layer sequentially executes the data processing as mentioned above, there is a restriction such that so long as the processing of the data which was previously received is not completely finished in the upper layer, the next data cannot be received. Therefore, since the system is subjected to such a restriction, a problem such that the high speed processing of the reception data or transmission data cannot be executed occurs.

SUMMARY OF THE INVENTION

It is, therefore, an object of the invention to provide communication processing system and communication processing method in which data can be processed at a high speed by efficiently and smoothly executing a data processing for transmission and reception.

According to the present invention, there is provided a communication processing system for performing a transmission and/or a reception of data by using a communication protocol standardized by a layer structure, comprising: large scale storing means which is commonly provided for each layer and has a large memory capacity; small scale storing means which is provided for each layer and has a memory capacity smaller than that of the large scale storing means; and data processing means for accumulating the data into the large scale storing means, recognizing the accumulated data, processing the data so as to be processed in the next layer by using the large scale storing means when a data amount is large in accordance with the recognition result, and transferring the data to the small scale storing means in the recognized layer and executing a data processing when the data amount is small.

According to the present invention, there is provided a communication processing method of performing a transmission and/or a reception of data by using a communication protocol standardized by a layer structure, comprising a data processing step of using large scale storing means which is commonly provided for each layer and has a large memory capacity and small scale storing means which is provided for each layer and has a memory capacity smaller than that of the large scale storing means, accumulating the data into the large scale storing means, recognizing the accumulated data, processing the data so as to be processed in the next layer by using the large scale storing means when a data amount is large in accordance with the recognition result, and transferring the data to the small scale storing means in the recognized layer and executing a data processing when the data amount is small.

According to the present invention, there is provided a storing medium in which a communication processing program for performing a transmission and/or a reception of data by using a communication protocol standardized by a layer structure has been stored, wherein the storing medium stores a data processing program for using large scale storing means which is commonly provided for each layer and has a large memory capacity and small scale storing means which is provided for each layer and has a memory capacity smaller than that of the large scale storing means, accumulating the data into the large scale storing means, recognizing the accumulated data, processing the data so as to be processed in the next layer by using the large scale storing means when a data amount is large in accordance with the recognition result, and transferring the data to the small scale storing means in the recognized layer and executing a data processing when the data amount is small.

BRIEF DESCRIPTION OF THE DRAWINGS

FIG. 6 is a flowchart for explaining a data transfer processing; and

FIG. 7 is a flowchart for allocating a memory area in accordance with a situation of a system.

DETAILED DESCRIPTION OF THE PREFERRED EMBODIMENT

An embodiment of the invention will now be described in detail hereinbelow with reference to the drawings.

Prior to describing a main construction according to the invention, a printer (ink jet printer or the like) which is suitable for applying the invention will be explained as an example with reference to FIG. 2. A communication data processing system will be also described with reference to FIGS. 3, 4, and 5. The printer to which the embodiment is applied is not limited to the ink jet printer but can be also applied to other various apparatuses.

Figure 2:
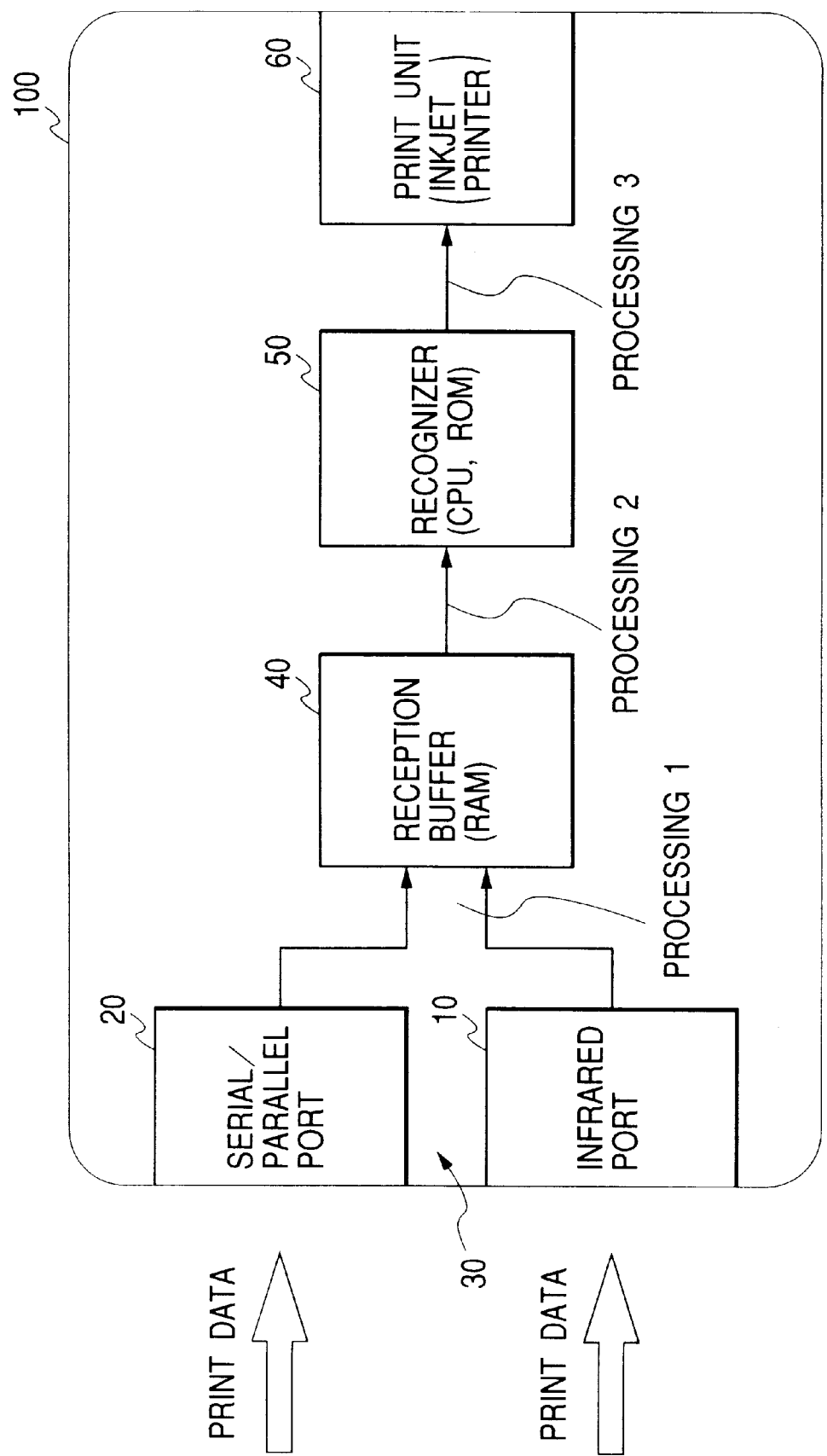
FIG. 2 is a block diagram of an ink jet printer having an infrared port.

FIG. 2 is a constructional diagram showing an ink jet printer with an ordinary construction to which the invention can be applied in a form such that the printer has an infrared communicating apparatus. In FIG. 2, an area 100 surrounded by a frame shows an apparatus built in the printer main body. However, a port unit 30 such as infrared port 10, serial/parallel port 20, and the like constructing a part of the invention can be also connected from the outside.

As a data flow from the port unit 30 to a print unit 60, data received from each port such as serial/parallel port 20, infrared port 10, or the like is accumulated into a memory area called a reception buffer 40 (processing 1). The accumulated data is recognized in a recognizer 50 and converted into print data (processing 2). The converted print data is actually printed by the print unit 60 (processing 3). The processings are executed in accordance with such a flow. The print unit 60 has a construction such that an ink jet head and a scanner head can be exchanged.

Figure 3:
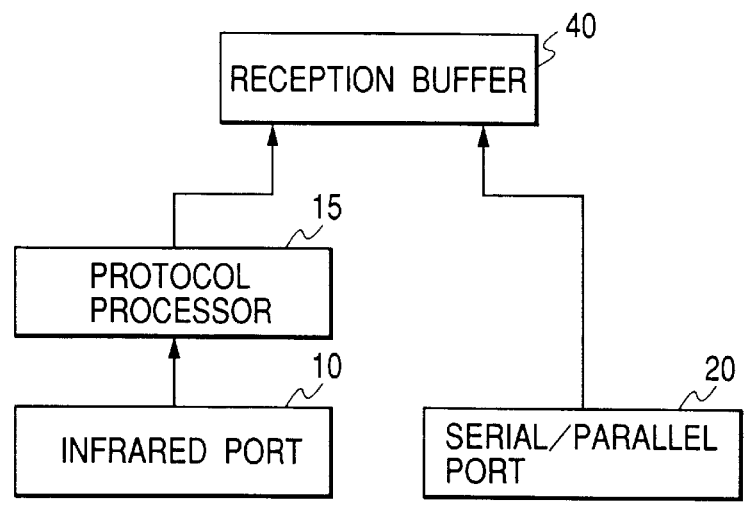
FIG. 3 is a block diagram showing a data flow from each port to a reception buffer.

FIG. 3 shows the data processing from each port to the reception buffer 40 further in details more than FIG. 2. As shown in FIG. 3, as compared with a communication using the serial/parallel port 20, it is necessary to perform a predetermined protocol processing for a communication using a protocol processor 15 such as an infrared communication or the like. It is an object of the invention to efficiently transmit the received data to the reception buffer 40 by the protocol processor 15.

Figure 4:
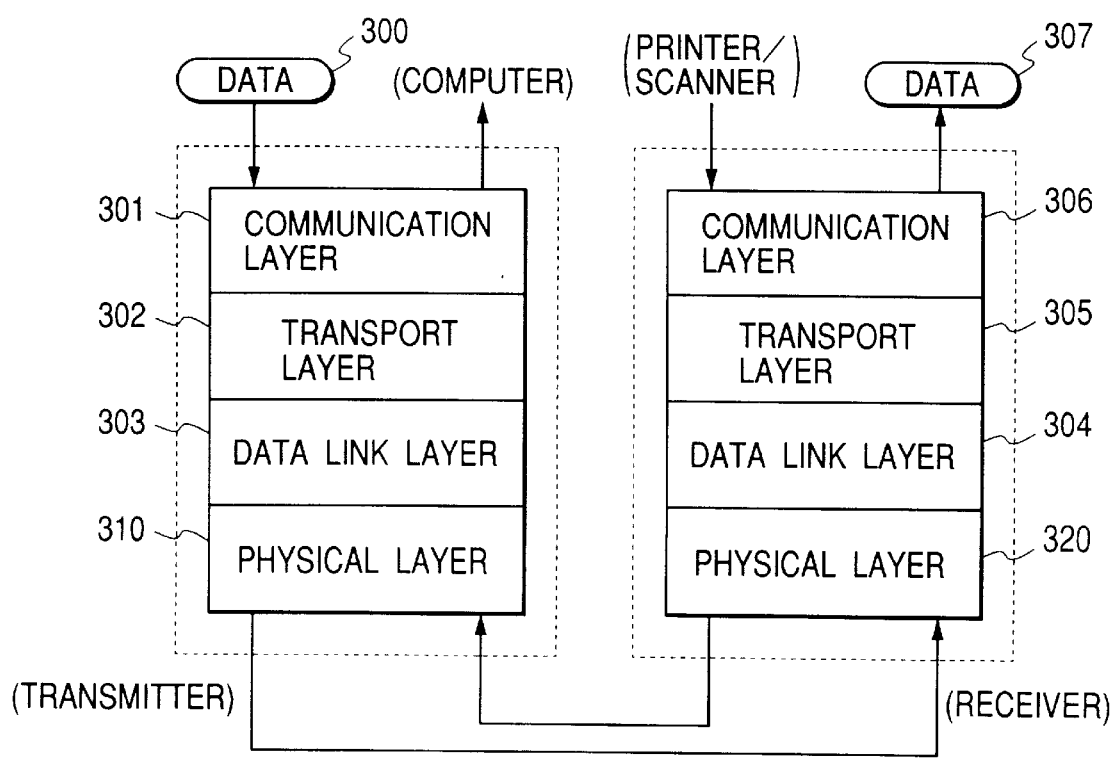
FIG. 4 is a block diagram showing a layer processing of a protocol processor in an infrared communication.
Figure 5:
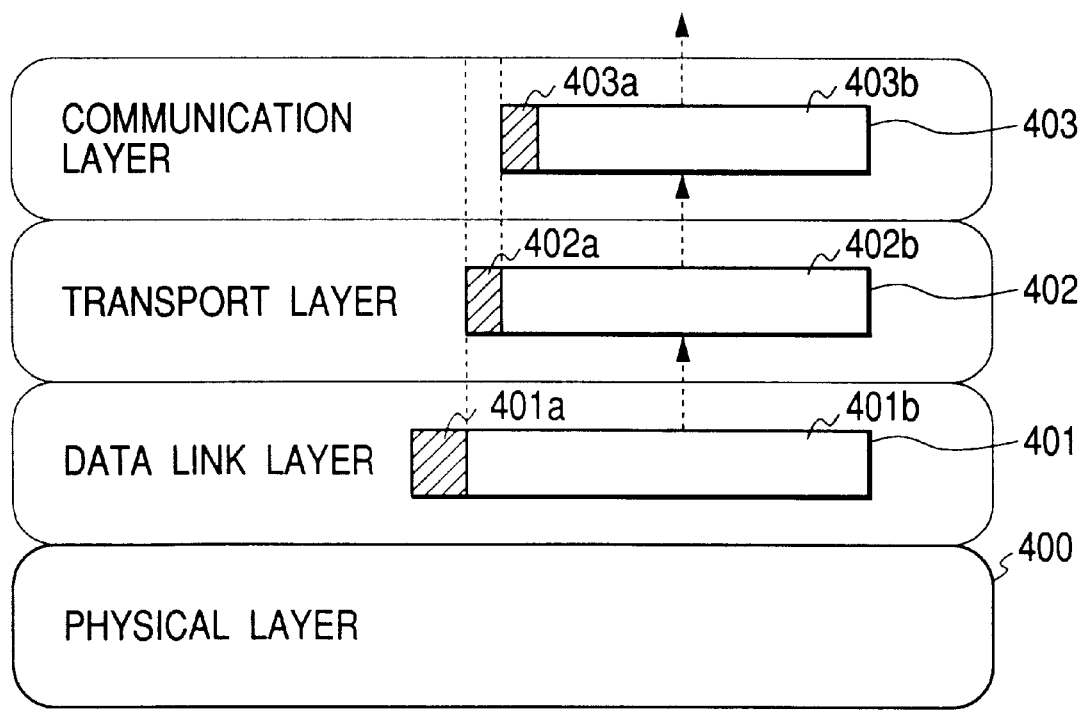
FIG. 5 is a block diagram showing a conventional processing of data passing through each layer.

FIG. 4 shows a data flow of the protocol processor 15 (an arrow in the diagram shows the data flow). Generally, although there are various communication protocols according to a communicating format, they are mainly based on the layer structure defined by the OSI. In FIG. 4, the layers on the left side are set to the transmission side such as a host computer or the like and the layers on the right side are set to the reception side such as a printer or the like used in the present embodiment. The embodiment will be described on the assumption that the print data is sent from the computer side to the printer.

Reference numeral 300 denotes digital data which is actually transmitted. When the data passes through layers 301, 302, and 303, information is added every layer. Finally, the digital data is converted into a pulse of light in a physical layer 310. The pulse of light is converted into digital data by a physical layer 320 on the right side (printer side). The converted data is accumulated in a memory area of a data link layer 304. The accumulated data is sequentially processed from each of layers 304, 305, and 306. Finally, data 307 is transferred from the top layer on the printer side to the reception buffer 40.

A construction of the communication processor (protocol processor) according to the invention will now be described with reference to FIG. 1. Reference numerals 501, 502, 503, and 504 denote layers in the same protocol processor as that shown in FIG. 4 mentioned above. The layers 501, 502, and 503 have a similar construction. A memory area 500 (RAM) serving as a large scale memory area of the reception data is commonly provided for the layers 501 to 503. As a memory area for reception, two memory areas (2 kbytes×2) are prepared and two memory areas are also similarly provided for transmission. In addition to the memory area 500, the layer 501 has a processor (CPU and ROM to store the program) 501-2 for executing processings in the layer and a small memory area 501-3 (RAM) which is managed every layer. As a small memory area for reception, 14 small memory areas (64 kbytes×14) are prepared and 14 small memory areas are also similarly prepared for transmission. The layers 502 and 503 also have a structure similar to that of the layer 501. In the invention, there is only one memory area 500 (4 kbytes) for reception. For convenience of explanation, it is assumed that the memory area 500 corresponds to the memory areas 501-1 to 501-3 shown in the layers 501 to 503. Since the memory area 500 for reception has a capacity of 4 kbytes, the number of memory areas can be set to one memory area (4 kbytes×1), two memory areas (2 kbytes×2), and four memory areas (1 kbytes×4) on the basis of the communication between the printer and the host computer. The same shall also similarly apply to the small memory areas.

Figure 1:
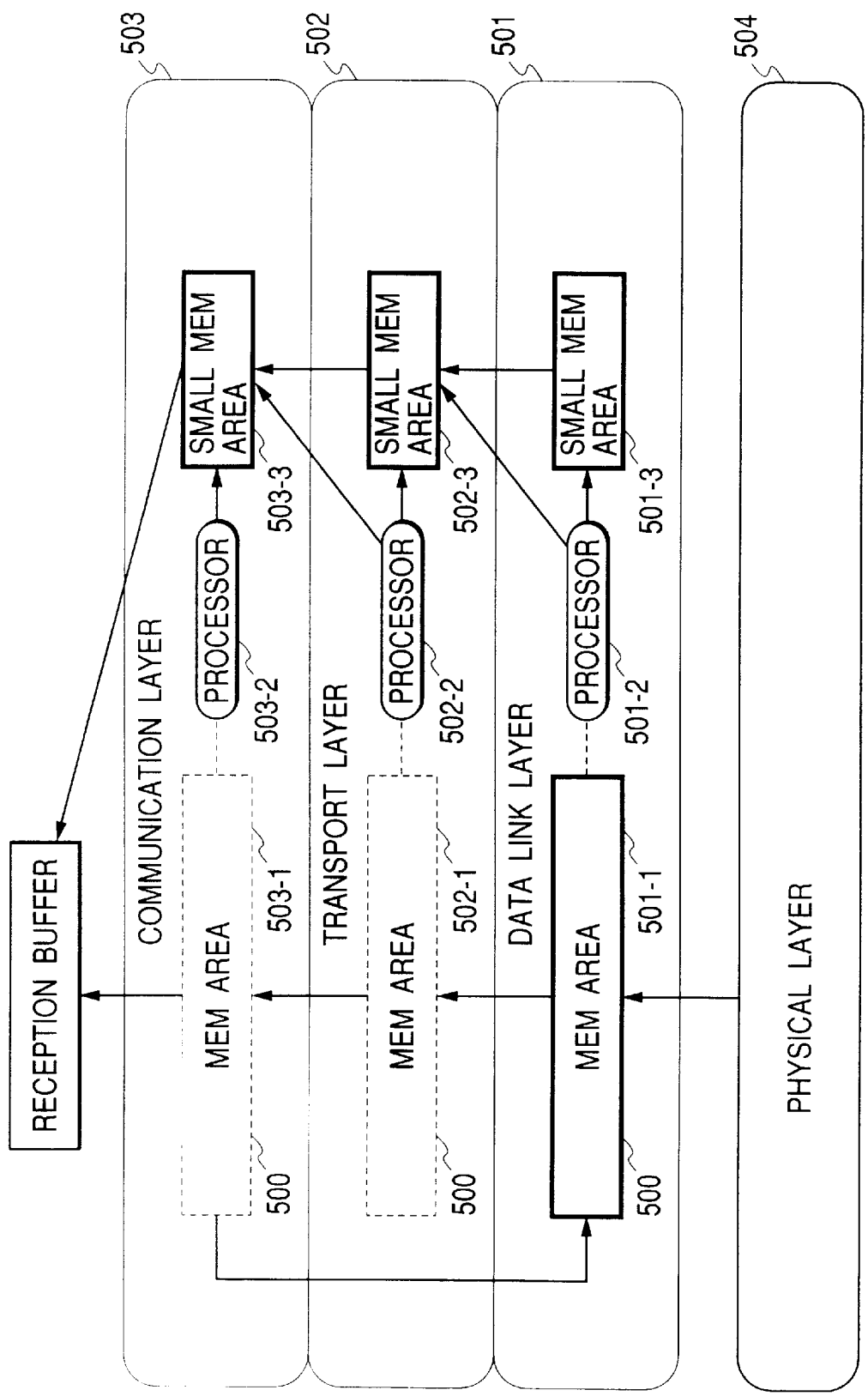
FIG. 1 is a block diagram showing a layer communication data processing according to an embodiment of the invention.

FIG. 1 shows the operation to transfer the access right from each of the layers 501 to 503 to the memory areas and indicates that the access right can be controlled from each of the layers 501 to 503.

Small areas 501-3, 502-3, and 503-3 are set in the layers 501 to 503. The small areas 501-3, 502-3, and 503-3 can be also mutually controlled every layers 501 to 503.

Reference numerals 501-2, 502-2, and 503-2 denote processors for performing operation processings of every layers 501 to 503 and executing the getting, recognition, and transfer of the data in the memory areas and small memory areas 501-3, 502-3, and 503-3 in the layers 501 to 503, respectively.

A data transfer processing will now be described with reference to FIG. 6. The program regarding the flowchart of FIG. 6 has been stored in the ROM of the processor.

In the processing apparatus constructed as mentioned above, the data is received from another apparatus through the physical layer 504. When the reception data is accumulated in the memory area 501-1 (S601), the processor 501-2 examines a transfer size to the upper layer (the kind of data can be further examined) and discriminates whether the data is transferred to a memory area 502-1 (substantially, memory area 501-1) (address copy) or the data is transferred to the small memory area (peculiar area of every layer) 501-3 (block copy) and is subsequently transferred to the small memory area 502-3 (S602).

By performing such a processing method, when the data is transferred to the upper layer, the data of a small size which is improper to use the whole memory area, data such that the processing is finished in a halfway layer, a command (usually, 64 bytes or less) such that the host computer inquires the state of the printer at a proper interval in order to confirm a connecting state of the infrared communication with the printer, or the like, and among them, the data of a size (data of 64 kbytes or less) which can be stored in each of the small memory areas 501-3, 502-3, and 503-3 is not merely transferred to the upper layer (address copy) (S603) as in the conventional method but the data is transferred to the small memory areas 501-3, 502-3, and 503-3 which are peculiar to the layers (S604) and, at the same time, the large scale memory area 501-1 is released (S605). Thus, the next data can be received into the released large scale memory area 500 and the next reception data can be accumulated at a speed higher than that in the processing which is generally executed.

To realize the conditions which enable the above processings, namely, to realize the parallel processings independently by the layers 501 to 503, the multitask OS can be used in the apparatus such as a printer or the like as a construction of software. In recent years, since the processings by the multitask OS are realized even in a peripheral apparatus such as a printer or the like, it is considered that there is no problem when installing the system of the invention to the printer or the like.

Although the above embodiment has been described with respect to one large scale memory area 500 (namely, 501-1 to 503-1) in order to easily understand the invention, similar processings can be performed even by using one or more memory areas.

Since the sizes and the numbers of memory area 500 and small memory areas 501-3, 502-3, and 503-3 can be set by software, the invention can cope with various types of peripheral apparatuses.

In the processing system for actually performing a data communication between two apparatuses, there is a deviation in amount of data to be transferred and it is a rare case where both of the apparatuses deal with the transmission and reception of the same data amount.

The above embodiment, therefore, has been described with respect to the example in which the memory area 500 (4 kbytes) is assured for reception and the memory area 500 (4 kbytes) is assured for transmission. However, an example of properly allocating the memory areas in accordance with a situation of the apparatus will now be described with reference to FIG. 7. The recognizer 50 discriminates whether the print head has been attached to the print unit or not (S701). When it is determined that the print head has been attached to the print unit, since an amount of reception data is large, the memory area of 6 kbytes is assured for reception and the memory area of 2 kbytes is assured for transmission (S703). When it is decided that the scanner head has been attached to the print unit, since an amount of transmission data is large, the memory area of 2 kbytes is assured for reception and the memory area of 6 kbytes is assured for transmission (S702). A program regarding the flowchart of FIG. 7 has been stored in the ROM of the processor.

Further, for example, in a case such that the data reception is mainly performed (printer in the foregoing example or the like), a using method such that the large scale memory area 500 as described in the above example is used as a memory area for reception and the small memory areas 501-3 to 503-3 of the small scale of every layers are selectively used in accordance with a size of data can be also used. In a case such that the data transmission is mainly performed (host computer or the like), a using method such that the small memory areas 501-3 to 503-3 of the layers are used for reception and the memory area 500 is switched and used as a memory area for transmission can be also used.

Although the embodiment has been explained with respect to the case of processing the reception data as an example, similar processings can be also executed even in case of processing the transmission data.

Although the embodiment has been described with respect to the infrared communication as an example, the invention is not limited to it but can be also applied to, for instance, a general wire or radio communication.

According to the invention as described above, the small scale memory areas which are independent every layer and the large scale memory area which is common to each layer are provided and each layer independently and simultaneously execute the processing of each layer in parallel. Therefore, the upper layer does not need to wait for the end of the processing in the lower layer, so that a high speed processing can be realized for the data for transmission and reception. Since an arbitrary number of small scale memory areas of an arbitrary size which are independent every layer and an arbitrary number of large scale memory areas of an arbitrary size which are common to each layer can be provided, they can be installed for various apparatuses.

Further, the data transfer method to the upper layer can be switched to either one of the address copy transfer and the area transfer in accordance with the result of the data recognition in each layer and the processor of each layer can control all of the memory areas, so that the data transfer can be efficiently performed.

What is claimed is:

1. A communication processing system for performing a transmission and/or a reception of data by using a communication protocol standardized by a layer structure, comprising:

large scale storing means which is commonly provided for each layer and has a large memory capacity;

small scale storing means which is provided for each of said layers and has a memory capacity smaller than that of said large scale storing means; and data processing means for accumulating the data into said large scale storing means, recognizing said accumulated data, processing said data so as to be processed in the next layer by using said large scale storing means when a data amount is large in accordance with a recognition result, and transferring said data to said small scale storing means in the recognized layer and executing a data processing when the data amount is small.

2. A system according to claim 1, wherein said data processing means further has means for examining a kind of data in each layer and transferring the data in accordance with the kind of said data.

3. A system according to claim 1, wherein a plurality of said large scale storing means are provided, and said data processing means further has means for sequentially storing the received data into said large scale storing means.

4. A system according to claim 1, wherein said data processing means further has means for extracting data that is finally necessary from the data stored in said large scale storing means.

5. A system according to claim 1, wherein said data processing means further has means which can arbitrarily set sizes of memory capacities of and the numbers of said large scale storing means and said small scale storing means.

6. A system according to claim 1, wherein after the data was transferred to said small scale storing means, said data processing means releases said large scale storing means.

7. A system according to claim 1, further comprising printing means for printing on the basis of said data.

8. A system according to claim 7, further comprising scanning means for scanning information recorded on a recording medium.

9. A system according to claim 8, further comprising means for assuring an area for reception of said large scale storing means larger than an area for transmission at the time of the printing by said printing means and assuring the area for reception of said large scale storing means smaller than the area for transmission at the time of the scanning by said scanning means.

10. A system according to claim 8, wherein a print head of said printing means and a scanner head of said scanning means can be exchanged, and said system has means for assuring an area for reception and an area for transmission of said large scale storing means in accordance with a kind of head attached.

11. A communication processing method of performing a transmission and/or a reception of data by using a communication protocol standardized by a layer structure, comprising a data processing step of using large scale storing means which is commonly provided for each layer and has a large memory capacity and small scale storing means which is provided for each layer and has a memory capacity smaller than that of said large scale storing means, accumulating the data into said large scale storing means, recognizing said accumulated data, processing said data so as to be processed in the next layer by using said large scale storing means when a data amount is large in accordance with a recognition result, and transferring said data to said small scale storing means in the recognized layer and executing a data processing when the data amount is small.

12. A method according to claim 11, wherein said data processing step further has means for examining a kind of data in each layer and transferring the data in accordance with the kind of said data.

13. A method according to claim 11, wherein a plurality of said large scale storing means are provided, and said data processing step further has step of sequentially storing the received data into said large scale storing means.

14. A method according to claim 11, wherein said data processing step further has means for extracting data that is finally necessary from the data stored in said large scale storing means.

15. A method according to claim 11, wherein said data processing step further has a step which can arbitrarily set sizes of memory capacities of and the numbers of said large scale storing means and said small scale storing means.

16. A method according to claim 11, wherein after the data was transferred to said small scale storing means, in said data processing step, said large scale storing means is released.

17. A method according to claim 11, further comprising a printing step of printing by printing means on the basis of said data.

18. A method according to claim 17, further comprising a scanning step of scanning information recorded on a recording medium by scanning means.

19. A method according to claim 18, further comprising a step of assuring an area for reception of said large scale storing means larger than an area for transmission at the time of the printing by said printing means and assuring the area for reception of said large scale storing means smaller than the area for transmission at the time of the scanning by said scanning means.

20. A method according to claim 18, wherein a print head of said printing means and a scanner head of said scanning means can be exchanged, and said method has a step of assuring an area for reception and an area for transmission of said large scale storing means in accordance with a kind of head attached.

21. A storing medium in which a communication processing program for performing a transmission and/or a reception of data by using a communication protocol standardized by a layer structure has been stored, wherein said storing medium stores a data processing program for using large scale storing means which is commonly provided for each layer and has a large memory capacity and small scale storing means which is provided for each layer and has a memory capacity smaller than that of said large scale storing means, accumulating the data into said large scale storing means, recognizing said accumulated data, processing said data so as to be processed in the next layer by using said large scale storing means when a data amount is large in accordance with a recognition result, and transferring said data to said small scale storing means in the recognized layer and executing a data processing when the data amount is small.

22. A storing medium according to claim 21, wherein said data processing program examines a kind of data in each layer and transfers the data in accordance with the kind of said data.

23. A storing medium according to claim 21, wherein a plurality of said large scale storing means are provided, and said data processing program sequentially stores the received data into said large scale storing means.

24. A storing medium according to claim 21, wherein said data processing program extracts data that is finally necessary from the data stored in said large scale storing means.

25. A storing medium according to claim 21, wherein said data processing program can arbitrarily set sizes of memory capacities of and the numbers of said large scale storing means and said small scale storing means.

26. A storing medium according to claim 21, wherein after the data was transferred to said small scale storing means, said data processing program releases said large scale storing means.

27. A storing medium according to claim 21, wherein a printing program for printing by printing means on the basis of said data is stored.

28. A storing medium according to claim 27, wherein a scanning program for scanning information recorded on a recording medium by scanning means is stored.

29. A storing medium according to claim 28, wherein a program for assuring an area for reception of said large scale storing means larger than an area for transmission at the time of the printing by said printing means and assuring the area for reception of said large scale storing means smaller than the area for transmission at the time of the scanning by said scanning means is stored.

30. A storing medium according to claim 28, wherein a print head of said printing means and a scanner head of said scanning means can be exchanged, and a program for assuring an area for reception and an area for transmission of said large scale storing means in accordance with a kind of head attached is stored.

* * * * *

UNITED STATES PATENT AND TRADEMARK OFFICE
CERTIFICATE OF CORRECTION

PATENT NO. : 6,006,294

DATED : December 21, 1999

INVENTOR(S) : MASASHI KURIHARA

It is certified that error appears in the above-identified patent and that said Letters Patent is hereby corrected as shown below:

COLUMN 5

Line 17, "layers 501" should read --layer 501--.
Line 19, "layers" should read --layer--.

COLUMN 6

Line 47, "layers" should read --layer--.

COLUMN 7

Line 2, "execute" should read --executes--.

COLUMN 8

Line 14, "of" should read --of:--.
Line 17, "ity" should read --ity; and--.
Line 18, "and" should be deleted.
Line 36, "step" should read --a step--.

UNITED STATES PATENT AND TRADEMARK OFFICE
CERTIFICATE OF CORRECTION

PATENT NO. : 6,006,294

DATED : December 21, 1999

INVENTOR(S) : MASASHI KURIHARA

It is certified that error appears in the above-identified patent and that said Letters Patent is hereby corrected as shown below:

COLUMN 9

```
Line 11, "for" should read --for:--.
Line 14, "ity" should read --ity; and--.
Line 15, "and" should be deleted.
```

Signed and Sealed this

Second Day of January, 2001

Attest:

Attesting Officer

Q. TODD DICKINSON

Commissioner of Patents and Trademarks